United States Patent
Park et al.

[11] Patent Number: 6,122,110
[45] Date of Patent: Sep. 19, 2000

[54] MULTI-STAGE COMBINED OPTICAL DEVICE HAVING MULTIPLE CHANNELS

[75] Inventors: Ki Soo Park; Ki Suk Sung; Yum Jae Chum; Sang Yeong Tae; Man Soo Seo, all of Suwon, Rep. of Korea

[73] Assignee: Samsung Electronics Co., Ltd., Kyungki-do, Rep. of Korea

[21] Appl. No.: 09/187,426

[22] Filed: Nov. 6, 1998

[30] Foreign Application Priority Data

Nov. 7, 1997 [KR] Rep. of Korea ............... 97-31395
Nov. 17, 1997 [KR] Rep. of Korea ............... 97-60603

[51] Int. Cl.[7] .................. G02B 27/30; G02B 25/00; G02B 6/00
[52] U.S. Cl. ................ 359/641; 359/645; 385/11
[58] Field of Search ................. 359/641, 644, 359/645; 385/11

[56] References Cited

U.S. PATENT DOCUMENTS

| | | | |
|---|---|---|---|
| 5,557,692 | 9/1996 | Pan et al. | 385/11 |
| 5,581,640 | 12/1996 | Pan et al. | 385/11 |
| 5,734,762 | 3/1998 | Ho et al. | 385/11 |
| 5,841,573 | 11/1998 | Kim | 359/341 |
| 5,982,539 | 11/1999 | Sirasaki | 359/484 |

*Primary Examiner*—Scott J. Sugarman
*Assistant Examiner*—Saeed Seyrafi
*Attorney, Agent, or Firm*—Sughrue, Mion, Zinn, Macpeak & Seas, PLLC

[57] ABSTRACT

A multi-stage combined optical device having an improved structure which can detect incident light power using a single optical isolator. The multi-stage combined optical device includes a first collimator for collimating a ray emitted from a first optical fiber, an optical isolator having a first polarizer for transmitting an incident ray in a birefringent manner into an ordinary ray and an extraordinary ray, a Faraday rotator for rotationally transmitting the incident ray, and a second polarizer for inversely transmitting the incident ordinary ray and extraordinary ray, sequentially disposed on an optical path, a second collimator for focusing the light transmitted through the second polarizer onto a second optical fiber, a third collimator facing the light receiving plane of the first polarizer and disposed at a position different from that of the first collimator, for focusing a ray emitted from a third optical fiber, and a fourth collimator facing the light emitting plane of the first polarizer and disposed at a position different from that of the second collimator, for focusing a ray emitted from the third collimator via the optical isolator onto a fourth optical fiber. Also, the multi-stage combined optical device further includes a tap formed on a light receiving plane facing the first collimator of the first polarizer, a first photodetector for receiving a first incident ray reflected from the tap and detecting the optical power of the first incident ray, and a second photodetector for receiving a second incident ray reflected from the tap and detecting the optical power of the second incident ray.

9 Claims, 4 Drawing Sheets

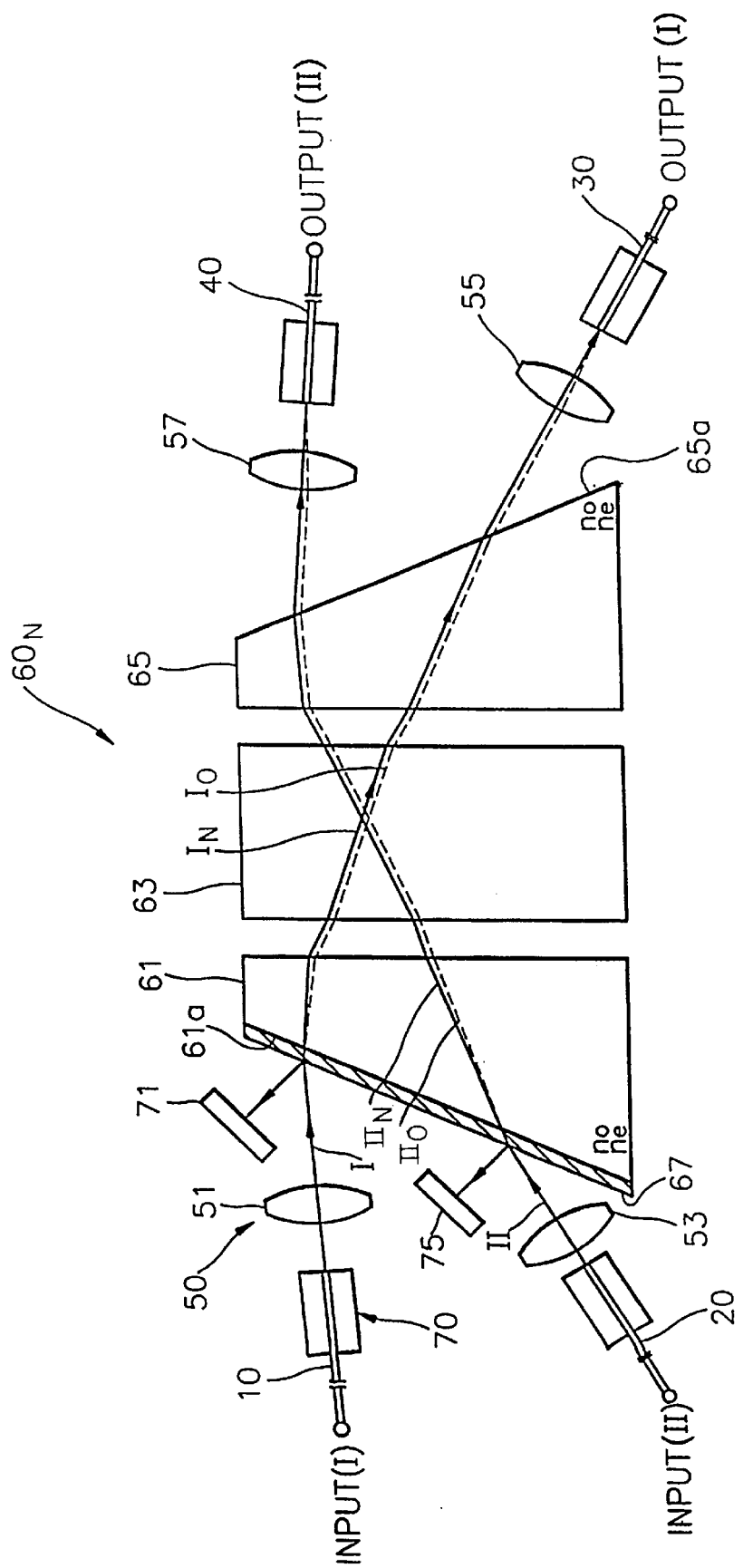

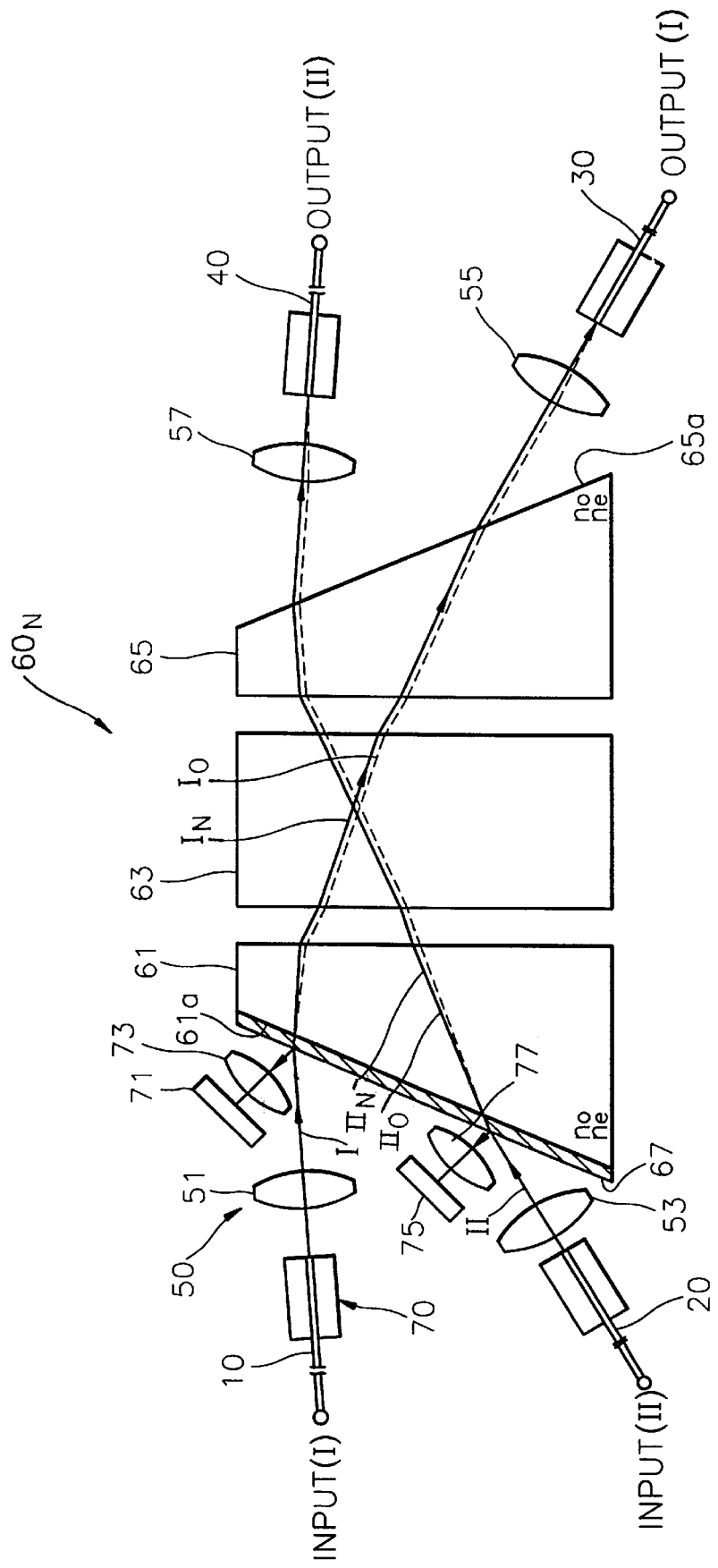

MULTI-STAGE COMBINED OPTICAL DEVICE HAVING MULTIPLE CHANNELS

BACKGROUND OF THE INVENTION

1. Field of the Invention

The present invention relates to a multi-stage combined optical device employed between optical fibers, for transmitting light traveling in one direction, blocking light traveling in the opposite direction, and separating incident light power. More particularly, the present invention relates to a multi-stage combined optical device having an improved isolator-tab-photodiode (ITP) which can function as a plurality of optical isolators and can detect incident light power using a single optical isolator.

2. Description of the Related Art

Conventionally, a multi-stage combined optical device includes an optical isolator, first and second collimators disposed on light receiving and emitting planes of the optical isolator. The optical isolator is used for blocking a reverse ray using polarization modes. The collimators are used for focusing light incident on and output from first and second optical fibers, respectively.

A conventional optical isolator using polarization modes, positioned in the path of a light ray travelling between two optical fibers, transmits forward rays and blocks reverse rays. To achieve this, the optical isolator is comprised of a first polarizer made of a birefringent crystal with a wedge shape, a Faraday rotator, and a second polarizer. Light traveling in a forward direction travels in sequence from the first polarizer to the Faraday rotator and to the second polarizer. This forward ray is separated into an ordinary ray and an extraordinary ray while passing through the first and second polarizer and then directed to the optical fibers.

The difference between the path of the light corresponding to the ordinary ray and that corresponding to the extraordinary ray is defined as a walk-off. If the walk-off is large, a time delay between the ordinary ray and the extraordinary ray is produced. Such a time delay causes a polarization mode dispersion.

To solve the above-described problem, the applicant of the present invention has proposed an optical isolator using polarization modes, which can reduce walk-off without additional optical elements, in U.S. patent application Ser. No. 08/851,997 (hereinafter '997) which is incorporated herein by reference. The optical isolator disclosed in '997 suppresses the reverse ray by changing the paths traveled by the forward ray and reverse ray. Thus, the optical isolator is used in transmitting a channel signal, i.e., a single light signal. This optical isolator can be used in an optical amplifier such as an EDFA (Erbium Doped Fiber Amplifier). In such an optical amplifier an optical isolator for guiding an incident light, containing information, that travels in a forward direction must be provided. An optical isolator for suppressing a backwardly incident light must be provided separately, creating an impediment in making a compact optical amplifier.

Also, in order to detect the light power of an incident ray, a tap for transmitting most of incident rays and reflecting parts thereof and a photodetector for receiving light reflected from the tap are installed in a front end of the optical isolator.

SUMMARY OF THE INVENTION

To solve the above problems, it is an objective of the present invention to provide a multi-stage combined optical device for implementing a two-channel structure by which at least two rays that travel backwards can be suppressed.

To achieve the above objective, there is provided a multi-stage combined optical device comprising: a first collimator for collimating a ray emitted from a first optical fiber; an optical isolator having a first polarizer, a Faraday rotator and a second polarizer sequentially disposed in an optical path, wherein said first polarizer transmits an incident ray in a birefringent manner separating said incident ray into an ordinary ray and an extraordinary ray, said Faraday rotator rotationally transmits the incident ray, and said second polarizer inversely transmits the incident ordinary ray and extraordinary ray; a second collimator for focusing the light transmitted through the second polarizer onto a second optical fiber; a third collimator facing a light receiving plane of the first polarizer for focusing a ray emitted from a third optical fiber, said third collimator being disposed at a position different from a position of the first collimator; and a fourth collimator facing a light emitting plane of the first polarizer for focusing a ray emitted from the third collimator via the optical isolator onto a fourth optical fiber, said fourth collimator being disposed at a position different from a position of the second collimator.

BRIEF DESCRIPTION OF THE DRAWINGS

The above objectives and advantages of the present invention will become more apparent by describing in detail a preferred embodiment thereof with reference to the attached drawings in which:

FIG. 3 illustrates an optical arrangement for a multi-stage combined optical device according to another embodiment of the present invention; and FIG. 4 illustrates an optical arrangement for a multi-stage combined optical device according to still another embodiment of the present invention.

DESCRIPTION OF THE PREFERRED EMBODIMENTS

Figure 1:
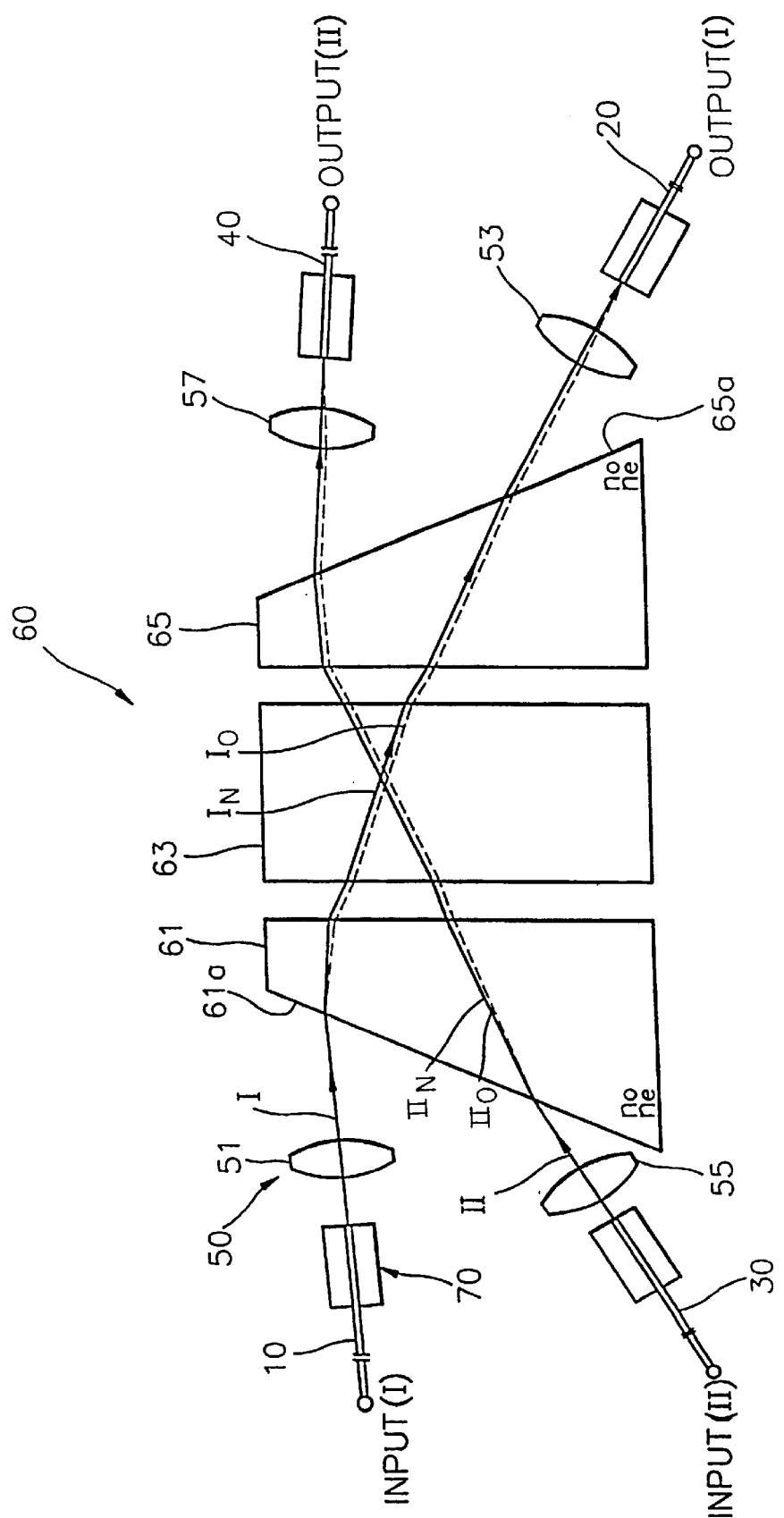
FIG. 1 illustrates an optical arrangement of a multi-stage combined optical device according to an embodiment of the present invention.

FIG. 1 shows a multi-stage combined optical device according to an embodiment of the present invention. The optical device is arranged in the optical paths of a first through fourth optical fibers, 10, 20, 30 and 40. These optical fibers for used for transmitting light signals. The multi-stage combined optical device transmits the light rays emitted from the first and third optical fibers 10 and 30 to the second and fourth optical fibers 20 and 40 according to a polarization mode of an incident ray. The optical device suppresses the rays emitted from the second and fourth optical fibers 20 and 40 and prevent them from travelling toward the first and third optical fibers 10 and 30.

The multi-stage combined optical device includes first and third collimators and 55 for focusing first and second incident rays I and II transmitted from the first and third optical fibers 10 and 30. The optical device also includes an optical isolator 60, and second and fourth collimators 53 and 57 for focusing the rays emitted from the optical isolator 60 onto the second and fourth optical fibers 20 and 40.

The first and third collimators 51 and 53 are on opposite sides of a light receiving plane of the optical isolator 60, and focuses the ray incident from the first optical fiber 10 to make collimated light.

Here, the first and second collimators 51 and 55 are disposed at different positions with respect to a light receiving plane 61a of the optical isolator 60 and prevents the first and second incident rays I and II transmitted from the respective collimators 51 and 55 from interfering with each other.

The optical isolator 60 includes a first polarizer 61 for transmitting the first and second incident rays I and II in a birefringent manner. A Faraday rotator 63 rotationally transmits the incident rays. A second polarizer 65 is provided for inversely transmitting an incident ordinary ray and an extraordinary ray. 61, 63 and 65 are arranged sequentially along an optical path. Here, the first polarizer 61 is made of a birefringent crystal and is shaped like a wedge. The first polarizer separates the first incident ray I into first and second rays IN and IO, and separates the second incident ray II into third and fourth rays IIN and IIO. The first and third rays IN and IIN are ordinary rays refracted according to a ordinary refractive index $n_o$ of the first polarizer 61, and the second and fourth rays IO and IIO are extraordinary rays refracted according to an extraordinary refractive index $n_e$ of the first polarizer 61.

The first polarizer 61 has a predetermined crystal optical axis. The first and third rays IN and IIN have polarization directions parallel to the crystal optical axis of the first polarizer 61, and the second and fourth rays IO and IIO have polarization directions vertical to the crystal optical axis.

The Faraday rotator 63 rotates the polarization direction of an incident ray a predetermined amount and transmits the same.

The second polarizer 65 is also made of a birefringent crystal and is also shaped like a wedge, like the first polarizer 61. The optical axis of the crystal in the second polarizer is different from that of the first polarizer 61. In other words, the optical axis of the crystal in second polarizer 65 is twisted a predetermined angle in an opposite direction of the polarization rotation of the Faraday rotator 63 with respect to the optical axis of the crystal in the first polarizer 61.

Thus, the first and third rays IN and IIN transmitted from the second polarizer 65 are turned into extraordinary rays, and the second and fourth rays IO and IIO are turned into ordinary rays.

The first and second polarizes 61 and 65 are symmetrically disposed on either side of the Faraday rotator 63, and have wedge shapes whose bottom planes are wider than the top planes.

The second collimator 53 is disposed to face a light emitting plane 65a of the optical isolator 60 and focuses the first and second rays IN and IO emitted from the optical isolator 60 onto the second optical fiber 20. The fourth collimator 57 is disposed to face the light emitting plane 65a of the optical isolator 60 and focuses the third and fourth rays IIN and IIO emitted from the optical isolator 60 onto the fourth optical fiber 40. Here, the second and fourth collimators 53 and 57 are disposed at different positions from each other so that they can focus the first and second incident rays I and II, respectively.

Figure 2:
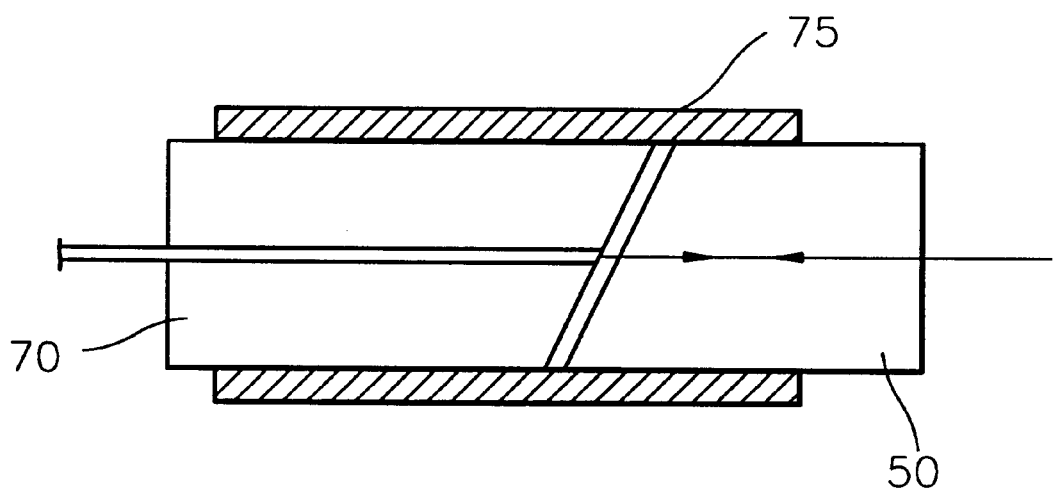
FIG. 2 is a schematic cross-sectional view illustrating a connection relationship between a glass ferrule and a collimator.

The first through fourth optical fibers 10, 20, 30 and 40 are preferably aligned by the glass ferrule 70, as shown in FIGS. 1 and 2.

Also, the first through fourth collimators 51, 53, 55 and 57 are preferably a graded index (GRIN) lens 50, as shown in FIG. 2, and the GRIN lens 50 is coupled to the glass ferrule 70 by a holder 75.

Hereinbelow, the operation of the multi-stage combined optical device according to an embodiment of the present invention will be described with reference to FIGS. 1 and 2.

The first incident ray I transmitted through the first optical fiber 10 is focused in the first collimator 51 and is received in the light receiving plane 61a of the first polarizer 61. The received first incident ray I is refracted in a birefringent manner into the first ray IN which is an ordinary ray and the second ray IO which is an extraordinary ray along the crystal optical axis of the first polarizer 61. The rays are then directed toward the second collimator 53 after passing through the Faraday rotator 63 and the second polarizer 65. Here, the first ray IN is turned into the extraordinary ray and the second ray IO is turned into the ordinary ray, along the rotational polarization direction of the Faraday rotator 63 and the crystal optical axis of the second polarizer 65. Thus, the first and second rays IN and IO are incident onto the second collimator 53 such that they are parallel to each other, without a difference between their optical paths. The incident light is transmitted from the second collimator 53 and is focused such that it can be output through the second optical fiber 20.

The second incident ray II input through the third optical fiber 30 is focused in the third collimator 55 and is transmitted to the fourth optical fiber 40 after passing through the optical isolator 60 and the fourth collimator 57. One skilled in the art will understand that changes to the second incident ray II are substantially the same as those of the first incident ray I.

Rays (not shown) incident from the second and fourth optical fibers 20 and 40 to the optical isolator 60 travel in different traveling paths from those of the first and second incident rays I and II, so that their transmission to the first and third optical fibers 10 and 30 is suppressed.

FIG. 3 shows a multi-stage combined optical device for transmitting light signals according to another embodiment of the present invention. It is arranged in optical paths corresponding to first through fourth optical fibers 10, 20, 30 and 40. It includes first and second collimators 51 and 53 for focusing first and second incident rays I and II transmitted from the first and second optical fibers 10 and 20. It has an optical isolator 60N, third and fourth collimators 55 and 57 for focusing the rays emitted from the optical isolator 60N onto the third and fourth optical fibers 30 and 40. It further has a first and second photodetectors 71 and 75 for receiving the light reflected from the optical isolator 60N.

The structures of the first through fourth collimators 51, 53, 55 and 57 and their optical arrangement are substantially the same as those in the above-described embodiment, and the detailed explanation thereof will be omitted.

The optical isolator 60N includes a first polarizer 61 for transmitting the first and second incident rays I and II in a birefringent manner. A Faraday rotator 63 rotationally transmits the incident rays. A second polarizer 65 inversely transmits an incident ordinary ray and an extraordinary ray. A tap 67 is formed on the light receiving plane 61a of the first polarizer 61. These elements are arranged sequentially along an optical path. The tap 67 can be formed by coating a material having a predetermined reflectivity, i.e., a material which can transmit most incident rays and can reflect parts thereof, by a conventional manner, e.g., chemical vapor deposition or sputtering.

The tap 67 transmits most of the first and second incident rays I and II emitted from the first and second optical fibers 10 and 20 and reflects parts thereof. The first and second incident rays I and II transmitted by the tap 67 are directed toward the first polarizer 61 and the rays reflected by the tap 67 are incident onto the first and second photodetectors 71 and 75.

The structures of the first and second polarizers 61 and 65, and the Faraday rotator 63, and their optical arrangement are substantially the same as those in the above-described embodiment.

The rays reflected by the tap 67 are received in the first and second photodetectors 71 and 75. The first and second photodetectors 71 and 75 detect the optical power of the light signals transmitted from the incident light through the first and second optical fibers 10 and 20. From the reflected rays, the degree of amplification of the light signals transmitted through a predetermined optical amplifier (not shown) can be detected.

Also, as shown in FIG. 4, fifth and sixth collimators 73 and 77 may be provided for focusing the incident rays and increasing the light detection efficiency in the optical path(s) between the tap 67 and the first photodetector 71 and/or between the tap 67 and the second photodetector 75.

Now, the operation of the multi-stage combined optical device according to another embodiment of the present invention will be described with reference to FIG. 3.

First, the fist incident ray I transmitted through the first optical fiber 10 is focused in the first collimator 51 and then is incident onto the tap 67. The tap 67 transmits a substantial portion of the incident rays toward the first polarizer 61 and reflects parts of the rays to the first photodetector 71. The first photodetector 71 detects the optical power of the rays transmitted from the incident rays through the optical fiber 10. The first incident ray I received in the first polarizer 61 is directed toward the second collimator 53 via the Faraday rotator 63 and the second polarizer 65, in a birefringent state. The first incident ray I gets converted into the first ray IN which is an ordinary ray and the second ray IO which is an extraordinary ray, along the crystal optical axis of the first polarizer 61. Here, the first ray IN is turned into the extraordinary ray and the second ray IO is turned into the ordinary ray along the rotational polarization direction of the Faraday rotator 63 and the crystal optical axis of the second polarizer 65. Thus, the two rays IN and IO are incident onto the third collimator 55, such that they are parallel to each other without a difference between their optical paths. The incident light is transmitted onto the third collimator 55 and then is focused and output through the third optical fiber 30.

The second incident ray II received through the second optical fiber 20 is focused in the second collimator 53 and is incident onto the tap 67. Most of the rays are transmitted through the tap 67, and some of the rays are reflected therefrom to then be incident onto the second photodetector 75. The optical power of the light irradiated from the second optical fiber 20 can be detected from the light detected by the second photodetector 75. The rays transmitted through the tap 67 travel toward the fourth optical fiber 40 via the first polarizer 61, the Faraday rotator 63, the second polarizer 65 and the fourth collimator 57.

As described above, the multi-stage combined optical device according to the present invention can guide the traveling direction of first and second incident rays using a single optical isolator. Therefore, since only a single optical isolator is necessary, when the multi-stage combined optical device is employed in an optical amplifier which would otherwise require two optical isolators, the optical arrangement is further simplified. Also, the number of elements is reduced, improving the fabrication efficiency.

Also, the optical power of light signals transmitted through two optical fibers can be detected by forming a tap on a light receiving plane of a polarizer.

Other modifications and variations to the invention ill be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A multi-stage combined optical device comprising:
    a first collimator for collimating a ray emitted from a first optical fiber;
    an optical isolator having a first polarizer, a Faraday rotator and a second polarizer sequentially disposed in an optical path, wherein said first polarizer transmits an incident ray in a birefringent manner separating said incident ray into an ordinary ray and an extraordinary ray, said Faraday rotator rotationally transmits the incident ray, and said second polarizer inversely transmits the ordinary ray and the extraordinary ray;
    a second collimator for focusing the light transmitted through the second polarizer onto a second optical fiber;
    a third collimator facing a light receiving plane of the first polarizer for focusing a ray emitted from a third optical fiber, said third collimator being disposed at a position different from a position of the first collimator; and
    a fourth collimator facing a light emitting plane of the second polarizer for focusing a ray emitted from the third collimator via the optical isolator onto a fourth optical fiber, said fourth collimator being disposed at a position different from a position of the second collimator.

2. The multi-stage combined optical device of claim 1, wherein the first polarizer and the second polarizer are made of a birefringent crystal and shaped like a wedge, wherein a bottom plane of the wedge is wider than a top plane of the wedge and said top plane and said bottom plane are symmetrical with each other and disposed on opposite sides of the Faraday rotator.

3. The multi-stage combined optical device of claim 1, wherein a glass ferrule for aligning the first optical fiber, the second optical fiber, the third optical fiber and the fourth optical fiber is provided at ends thereof.

4. The multi-stage combined optical device of claim 1, wherein the first collimator, the second collimator, the third collimator and the fourth collimators are graded index (GRIN) lenses.

5. The multi-stage combined optical device of claim 1, further comprising:
    a tap formed on a light receiving plane facing the first collimator;
    a first photodetector for receiving a first incident ray reflected from the tap and detecting an optical power of the first incident ray; and
    a second photodetector for receiving a second incident ray reflected from the tap and detecting an optical power of the second incident ray.

6. The multi-stage combined optical device of claim 5, further comprising at least a collimator for focusing incident rays onto at least one of the first and second photodetectors.

7. The multi-stage combined optical device according to claim 5, wherein the first polarizer and the second polarizer are made of a birefringent crystal and shaped like a wedge, wherein a bottom plane of the wedge is wider than a top plane of the wedge and said top plane and said bottom plane are symmetrically disposed on opposite sides of the Faraday rotator.

8. The multi-stage combined optical device of claim 5, wherein a glass ferrule for aligning the first optical fiber, the second optical fiber, the third optical fiber and the fourth optical fiber is provided at ends thereof.

9. The multi-stage combined optical device of claim 8, wherein the first collimator, the second collimator, the third collimator and the fourth collimator are graded index (GRIN) lenses, respectively.

* * * * *